(12) United States Patent
Francom

(10) Patent No.: US 7,116,150 B2
(45) Date of Patent: *Oct. 3, 2006

(54) CLOCK GATER CIRCUIT AND ASSOCIATED METHOD

(75) Inventor: Erin Dean Francom, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/868,515

(22) Filed: Jun. 15, 2004

(65) Prior Publication Data

US 2004/0222836 A1    Nov. 11, 2004

Related U.S. Application Data

(63) Continuation of application No. 10/347,778, filed on Jan. 21, 2003, now Pat. No. 6,809,570.

(51) Int. Cl.
*H03K 5/02* (2006.01)
(52) U.S. Cl. ...................................... 327/178; 327/365
(58) Field of Classification Search ................ 327/166, 327/175, 178, 225, 291, 292, 299, 365, 376, 327/377
See application file for complete search history.

(56) References Cited

U.S. PATENT DOCUMENTS

| 5,661,751 | A | * | 8/1997 | Johnson ....................... 375/219 |
| 5,726,596 | A | * | 3/1998 | Perez ........................... 327/292 |
| 5,760,610 | A | * | 6/1998 | Naffziger ...................... 326/93 |
| 5,901,061 | A |   | 5/1999 | Gaddis et al. |
| 5,925,133 | A | * | 7/1999 | Buxton et al. ............... 713/323 |
| 6,137,331 | A | * | 10/2000 | Peset Llopis ............... 327/199 |
| 6,194,938 | B1 | * | 2/2001 | Waldrop ....................... 327/291 |
| 6,232,820 | B1 | * | 5/2001 | Long et al. .................. 327/374 |
| 6,281,710 | B1 | * | 8/2001 | Poirier et al. ................. 326/93 |
| 6,310,499 | B1 |   | 10/2001 | Radjassamy |
| 6,331,800 | B1 |   | 12/2001 | Radjassamy |
| 6,407,602 | B1 |   | 6/2002 | Radjassamy |
| 6,429,698 | B1 | * | 8/2002 | Young .......................... 327/99 |
| 6,459,318 | B1 | * | 10/2002 | Brauch ........................ 327/259 |

* cited by examiner

*Primary Examiner*—Timothy P. Callahan
*Assistant Examiner*—Cassandra Cox

(57) ABSTRACT

One embodiment is a clock gater circuit comprising an inverter block for driving an output clock signal responsive at least in part to an input clock signal that is selectively driven via a clock generator circuit to an input node of the inverter block responsive to a qualifier signal. Also included is circuitry for restoring a logic level at the input node of the inverter block to a particular value, the circuitry operating responsive to the qualifier signal.

17 Claims, 8 Drawing Sheets

US 7,116,150 B2

CLOCK GATER CIRCUIT AND ASSOCIATED METHOD

CLAIM OF PRIORITY UNDER 35 U.S.C. §120 & 37 C.F.R. §1.78 AND CROSS-REFERENCE TO RELATED APPLICATION(S)

This nonprovisional application is a continuation application claiming the benefit of the following prior United States patent application entitled: "CLOCK GATER CIRCUIT," application Ser. No. 10/347,778, filed Jan. 21, 2003 now U.S. Pat. No. 6,809,570, in the name(s) of Erin Dean Francom, which is hereby incorporated by reference.

BACKGROUND

Many, if not most, of the integrated circuits ("ICs") currently being produced include some number of clocked logic circuits. A clocked logic circuit is one that performs its function subsequent to the assertion (or ddeassertion) of a clock signal. For example, some logic circuits (e.g., static logic circuits) cannot perform their intended functions until a clocked enable signal is asserted. Other logic gates (e.g., certain dynamic logic circuits) are alternately precharged and enabled by a clock signal and can only perform their intended functions during the enable phase of the clock signal.

Large-scale microprocessor ICs are designed to include clock distribution systems for distributing clock signals to various circuits on the IC and implement an overall clocking strategy. Typically, such clock distribution systems include devices called "clock gaters," or simply "gaters". Gaters buffer the clock signal, restoring strength thereto so that it is capable of driving a circuit.

It will be recognized that, in some instances (e.g., in order to conserve power or reduce heat generation), it will be necessary to inhibit operation of one or more circuits on the IC chip for a predetermined number of clock cycles while the remainder of the chip continues to function. In this regard, clock gaters can function as a simple on/off switch for the clock, controlling whether or not the clock signal flows through to the clocked circuit, thereby controlling whether or not the circuit operates.

FIG. 1A is a schematic diagram of a conventional prior art clock gater circuit 100. The gater circuit 100 includes an independently-controlled push-pull inverter 102 to create an output clock signal ("CK") from an input clock signal ("SLCBO"). In particular, a push control signal NPU is connected to a PFET 104a of the inverter 102; this comprises the "push" structure. Similarly, a pull control signal PD is connected to an NFET 104b of the inverter 102; this comprises the "pull" structure. In normal operation, a signal output from the inverter 102 flips up or down depending on the state of the push and pull control signals.

A qualifier ("QUALH") signal, latched by a gate 106, can enable or disable the pull control signal PD on the push-pull inverter 102, thus respectively enabling or disabling the flow of the clock signal through the circuit 100. The primary problem with the clock gater circuit 100 is that the set-up time, that is, the amount of time prior to the firing of the input clock the QUALH signal needs to be asserted or deasserted, is significant. As a result, if the QUALH signal does not transition sufficiently early relative to the input clock signal, the output clock signal CK will not be enabled or disabled as desired. In the case of failure to disable the clock, this can result unnecessary power consumption and heat generation. Additionally, if the qualifier signal is too late or too early (i.e., does not meet timing requirements), the resulting extra or nonexistent clock could cause the processor to perform a calculation incorrectly.

FIG. 1B is a gate level block diagram of the circuit 100. As best shown in FIG. 1B, the input clock signal SLCBO is delayed by a gate 120 to form a delayed clock signal ckd, which in turn is NANDed with the QUALH signal by a NAND gate 122 to produce an FBN signal. The FBN signal is NORed with the input clock signal SLCBO by a NOR gate 124 to produce the pull down control signal PD, which is applied to the gate of the FET 104b. The output clock signal is fed back and NANDed with the input clock signal SLCBO by a NAND gate 126 to produce the push up control signal NPU, which is applied to the gate of the FET 104a. The drains of the FETs 104a, 104b, designated as an nck node 127, are connected to the input of an inverter 128, the output of which comprises the output clock signal CK. The output of the inverter 128 is connected to the input of a second inverter 130, the output of which is connected to the input of the inverter 128 to form a feedback loop.

Operation of the gater circuit 100 is illustrated in a timing diagram in FIG. 2. As illustrated in FIG. 2, a waveform 200 represents the voltage level (from 0.0 V to 1.20 V) of the input clock signal SLCBO over time (in nanoseconds ("ns"). Two and a half cycles of the input clock SLCBO comprising three rising edges 201a, 201b, and 201c, and two falling edges 202a, 202b, are illustrated in FIG. 2. Waveforms 204a and 204b represent QUALH signals asserted and subsequently deasserted at different points in time with respect to the input clock signal SLCBO. In particular, the QUALH signal represented by the waveform 204a is asserted and subsequently deasserted approximately 10 ps earlier in time than the QUALH signal represented by the waveform 204b.

As will be noted with reference to FIG. 2, the earlier QUALH signal, represented by waveform 204a, is asserted (as represented by a rising edge 205a thereof) a time t1 after the immediately preceding falling edge 202a of the input clock signal SLCBO (waveform 200). Because the length of time t1 is short enough to meet the set-up time requirements, the next cycle of the output clock signal CK is enabled, as represented by a waveform 208a. In contrast, the later QUALH signal, represented by waveform 204b, is asserted (as represented by a rising edge 205b thereof) a time t2 after the immediately preceding falling edge 202b of the input clock signal SLCBO (waveform 200). In this case, because the length of time t2 does not meet set-up time requirements, the next cycle of output clock signal CK is suppressed, as represented by a waveform 208b.

Similarly, the first QUALH signal (waveform 204a) is deasserted (as represented by a falling edge 210a thereof) a time t3 after the immediately preceding falling edge 202b of the input clock signal SLCBO (waveform 200). Because the length of time t3 meets the set-up time requirements, the deassertion of the QUALH signal results in suppression of the next cycle of the output clock signal CK, as represented by a waveform 212a. In contrast, the second QUALH signal (waveform 204b) is deasserted (as represented by a falling edge 210b thereof) a time t4 after the immediately preceding falling edge 202b of the input clock signal SLCBO (waveform 200). Because the length of time t4 does not meet the set-up time requirements, the deassertion of the QUALH signal results fails to suppress the next cycle of the output clock signal CK, as represented by a waveform 212b.

FIG. 2 illustrates the concept of negative set-up time. In particular, a positive set-up time indicates a point in time prior to firing of the input clock signal within which the QUALH signal must be asserted/deasserted in order to respectively enable/disable the output clock signal. A negative set-up time indicates a point in time following firing of the input clock signal before which the QUALH signal must be asserted/deasserted in order to respectively enable/disable the output clock signal for the immediately succeeding cycle. In the examples shown in FIG. 2, the set-up time is approximately −70 picoseconds ("ps"), meaning that the QUALH signal must be asserted/deasserted before 70 ps after the firing of the input clock signal in order to effectively enable/disable the output clock signal for the immediately succeeding cycle. As shown in FIG. 2, times t1 and t3 meet the set-up time requirements (i.e., are less than or equal to 70 ps); times t2 and t4 do not (i.e., are greater than 70 ps).

FIG. 3 illustrates a timing diagram that is identical to the timing diagram illustrated in FIG. 2 except that it includes several additional waveforms 300a, 300b, 302a and 302b. The waveforms 300a and 300b represent the voltage level of the control signal PD respectively corresponding to the earlier-asserted/deasserted QUALH signal (waveform 204a) and the later-asserted/deasserted QUALH signal (waveform 204b). The waveforms 302a and 302b represent the voltage level of the nck node 127 respectively corresponding to the earlier-asserted/deasserted QUALH signal (waveform 204a) and the later-asserted/deasserted QUALH signal (waveform 204b).

At least one attempt has been made to design a "fast qualifier"; that is, a gater with a lower set-up time than conventional gaters such as the one illustrated in FIGS. 1A, 1B, and 2. This attempt, resulted in a gater that achieved a 90 ps set-up time advantage over a conventional gater on the falling edge of the qualifier signal in a 0.18 µm process; however, the rising edge of the qualifier signal could push the output clock edge out over 100 ps, depending on the arrival time of the qualifier signal with respect to the input clock. Additionally, this design had an interstitial precharger in the pull-down structure, which reduced gain, and retained all of the original FETs, requiring a second qualifier for proper operation. This design also resulted in a net increase of two FETs over a conventional gater and therefore occupied more space on the IC chip than a conventional gater.

SUMMARY

One embodiment is a clock gater circuit comprising an inverter block for driving an output clock signal responsive at least in part to an input clock signal that is selectively driven via a clock generator circuit to an input node of the inverter block responsive to a qualifier signal. Also included is circuitry for restoring a logic level at the input node of the inverter block to a particular value, the circuitry operating responsive to the qualifier signal.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1A:
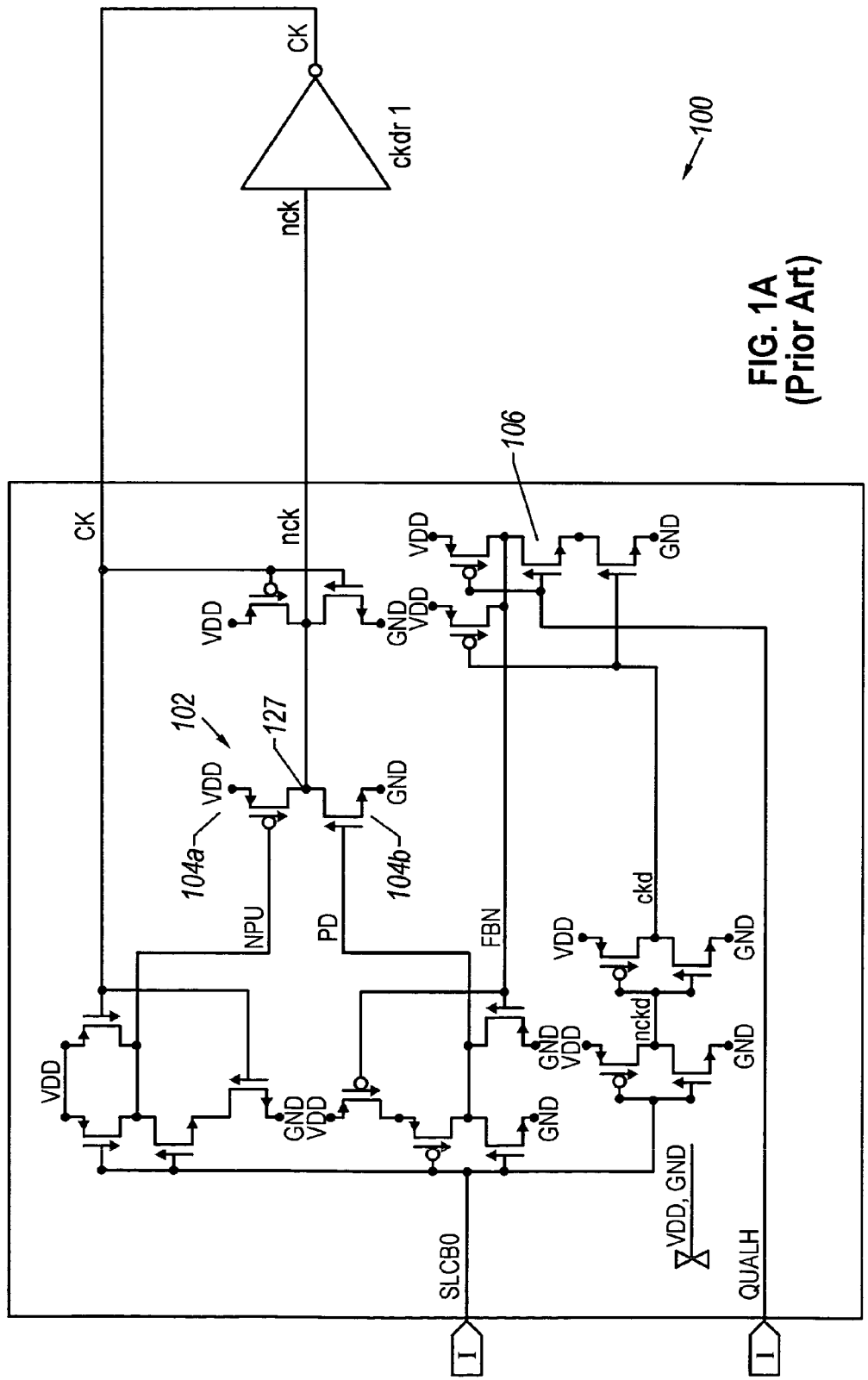
FIG. 1A is a schematic diagram of a prior art clock gater circuit.

In the drawings, like or similar elements are designated with identical reference numerals throughout the several views thereof, and the various elements depicted are not necessarily drawn to scale.

Figure 4A:
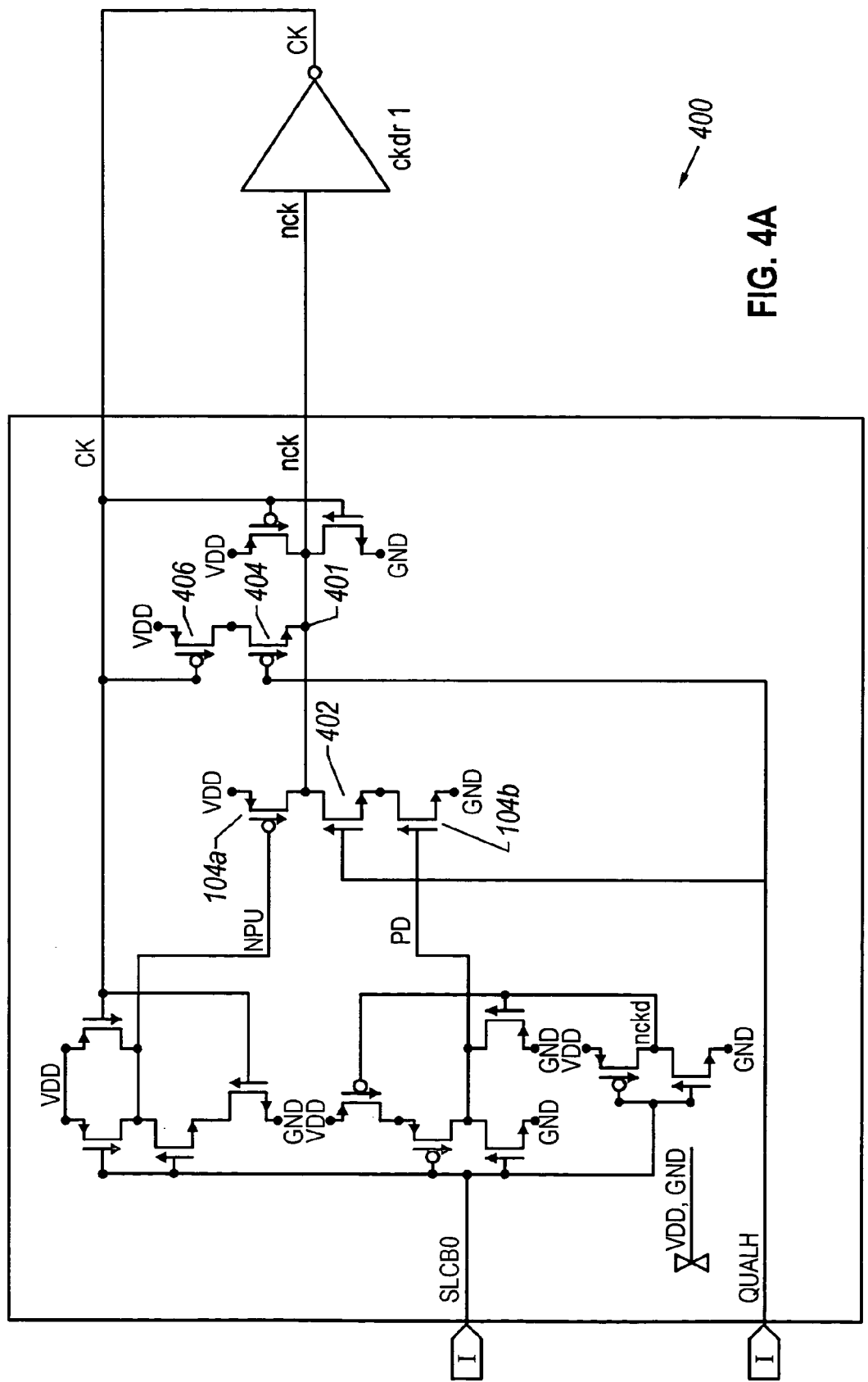
FIG. 4A is a schematic diagram of a clock gater circuit of one embodiment.

FIG. 4A is a schematic diagram of a clock gater circuit 400 of one embodiment. In contrast to the gater circuit 100 (FIGS. 1A and 1B), in the implementation illustrated in FIG. 4A, the push/pull control signals NPU and PD are pulses that cannot pulse simultaneously. Instead, for example, the control signal PD pulls and releases, or pulses, and a feed-back mechanism subsequently holds the voltage level of a node nck, designated in FIG. 4A by a reference numeral 401, low. Subsequently, the control signal NPU pushes and releases, or pulses, resulting in the voltage level at the nck node 401 flipping to the opposite level (i.e., high) and holding again. In accordance with one embodiment, in contrast with the circuit 100, in which the pull structure comprises a single NFET (FET 104b), in the circuit 400 the pull structure comprises two NFETs, including the FET 104b and a new FET designated by reference numeral 402.

As a result, the pull structure of the circuit 400 comprises a partial NAND structure. Instead of the PD pulse signal constantly pulling the nck node 401 low, it is gated by the FET 402 positioned atop the FET 104b. Specifically, the FET 402 directly enables/disables the pull mechanism, thus enabling or disabling the switching of the clock. In other words, if the QUALH signal is low (unasserted), the effect of the FET 104b on the node nck 401 is impeded by the FET 402 and the output of the gater (i.e., the output clock signal CK) does not move.

Figure 1B:
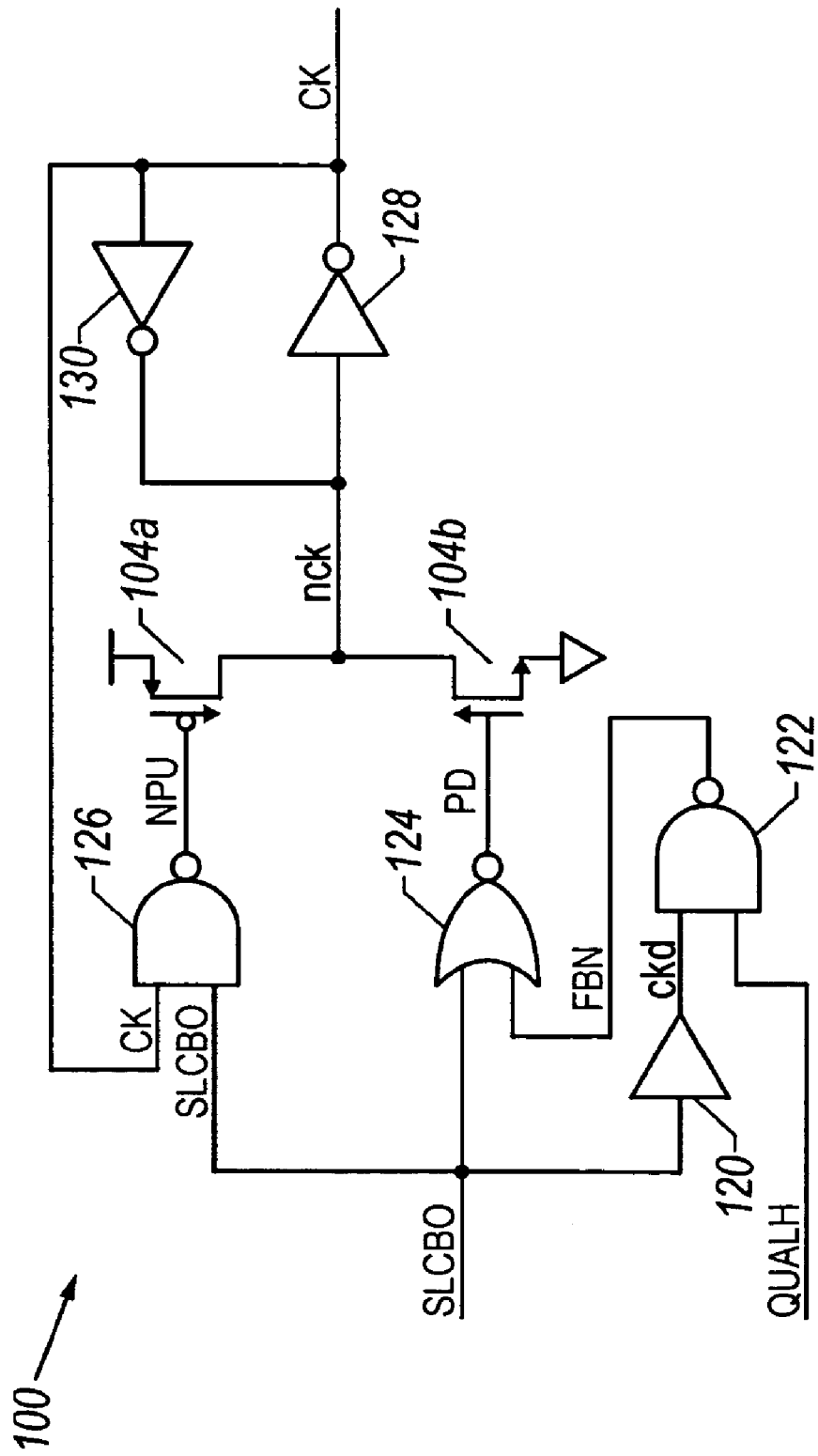
FIG. 1B is a gate-level block diagram of the gater circuit of FIG. 1A.

The circuit 400 also includes two new FETs, designated by reference numerals 404 and 406. Each of the FETs 404, 406, is a PFET. The purpose of the FETs 404, 406, is to restore the voltage level of the nck node 401 to its previous voltage level if the QUALH signal is toggled late and the FET 104b has started to pull slightly but ultimately does not pull completely. In this situation, the FETs 404 and 406 can restore the charge on the nck node 401 even with a voltage droop of approximately $V_{DD}/2$. This prevents voltage disturbances at the nck node 401 and allows more time for the QUALH signal to be toggled in the circuit 400 than in the circuit 100 (FIGS. 1A and 1B). Additionally, when the QUALH signal is not toggled and the gater circuit 400 is not qualified, the FETs 404, 406 hold the output clock signal CK in a fixed position so as to prevent it from wiggling.

In the gater circuit 100 illustrated in FIGS. 1A and 1B, if the output clock CK is to be suppressed, the pull control signal PD does not move. In contrast, in the gater circuit 400 illustrated in FIG. 4A, as will be discussed in greater detail in reference to FIG. 6 described below, the pull control signal PD moves any time the input clock signal SLCBO fires; however, the effect of the pull control signal PD on the nck node 401 is "qualified" by assertion/deassertion of the QUALH signal. In particular, if the QUALH signal toggles low very late with respect to the firing of the input clock signal SLCBO, the nck node 401 might begin to pull low, so the FETs 404, 406, pull up on the nck node 401 so that the output clock signal CK does not move, resulting in a decreased set-up time.

The circuit 400 is implemented using three new FETs (402, 404, and 406) that are not included in the circuit 100, but eliminates six FETs that are included in the circuit 100, for a net decrease of three in the number of FETs employed to implement the clock gater circuitry. Additionally, the QUALH signal has approximately three gate delays to the nck node 127 in the gater circuit 100. In the gater circuit 400, it has approximately one gate delay to the nck node 401. Thus, one embodiment advantageously reduces gate delay (i.e., setup time) with no area impact. In fact, by reducing the overall FET count, there is a considerable savings in the circuit area. It should be appreciated that where a typical VLSI processor could include tens of thousands of gater circuits, the area savings realized by using an embodiment described herein can be quite significant.

Figure 4B:
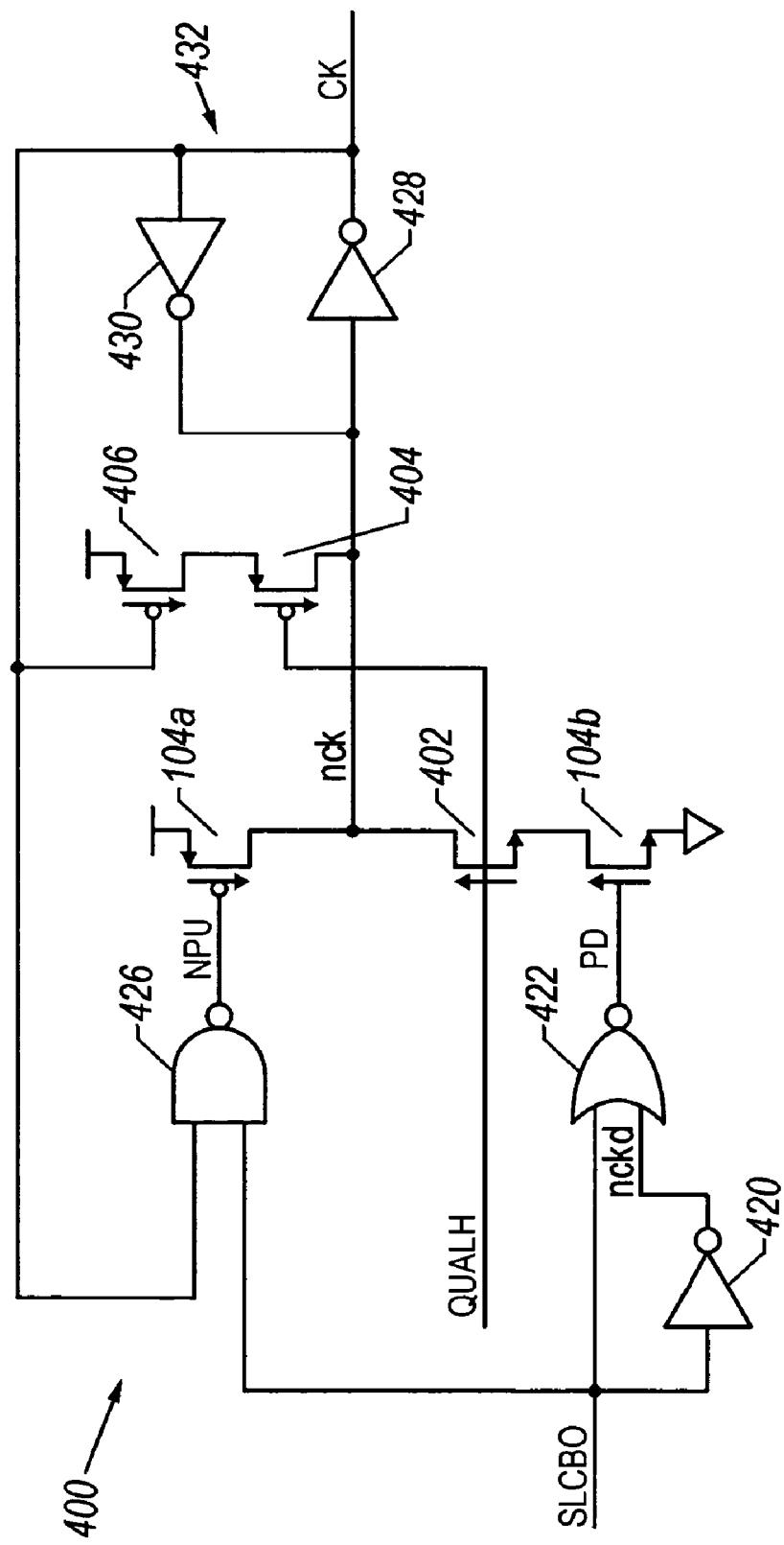
FIG. 4B is a gate-level block diagram of the gater circuit of FIG. 4A.

FIG. 4B is a gate level block diagram of the circuit 400. As best shown in FIG. 4B, the input clock signal SLCBO is inverted by an inverter 420 to form an inverted delayed clock signal nckd. The inverted delayed clock signal nckd is NORed with the input clock signal SLCBO by a NOR gate 422 to produce a pull down control signal PD. The pull down control signal PD is applied to the gate of the FET 104b. The drain of the FET 104b is tied to the source of the FET 402. The QUALH signal is applied directly to the gates of both the FET 402 and the FET 404. The output clock signal CK is fed back and NANDed with the input clock signal SLCBO by a NAND gate 426 to produce the push up control signal NPU, which is applied to the gate of the FET 104a. The drains of the FETs 104a, 402, designated as an nck node, are connected to the input of an inverter 428, the output of which comprises the output clock signal CK. The output of the inverter 428 is connected to the input of a second inverter 430, the output of which is connected to the input of the inverter 428 to form a feedback loop 432. The output clock signal CK is also applied to the gate of the FET 406.

Figure 5:
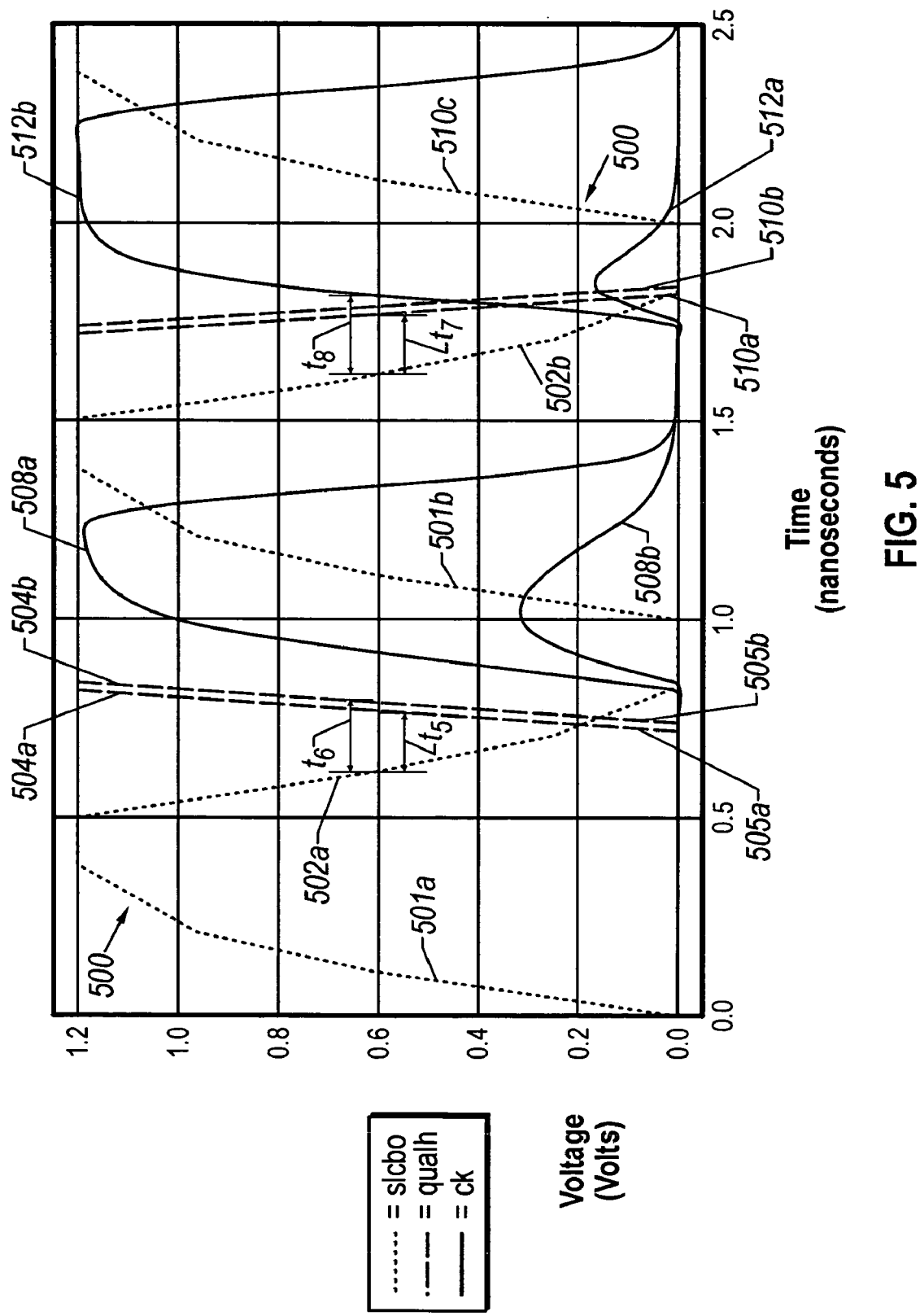
FIGS. 5 and 6 are timing diagrams illustrating operation of the clock gater circuit of FIGS. 4A and 4B.

Operation of the gater circuit 400 is illustrated in a timing diagram in FIG. 5. As illustrated in FIG. 5, a waveform 500 represents the voltage level (from 0.0 V to 1.2V) of the input clock signal SLCBO over time (in nanoseconds ("ns")). Two and a half cycles of the input clock SLCBO comprising three rising edges 501a, 501b, and 501c, and two falling edges 502a, 502b, are illustrated in FIG. 5. Waveforms 504a and 504b represent QUALH signals asserted and subsequently deasserted at different points in time with respect to the input clock signal SLCBO. In particular, the QUALH signal represented by the waveform 504a is asserted and subsequently deasserted approximately 10 ps earlier in time than the QUALH signal represented by the waveform 504b.

As will be noted with reference to FIG. 5, the earlier QUALH signal, represented by waveform 504a, is asserted (as represented by a rising edge 505a thereof) a time t5 after the immediately preceding falling edge 502a of the input clock signal SLCBO (waveform 500). Because the length of time t5 is short enough to meet the set-up time requirements, the next cycle of the output clock signal CK is enabled, as represented by a waveform 508a. In contrast, the later QUALH signal, represented by waveform 504b, is asserted (as represented by a rising edge 505b thereof) a time t6 after the immediately preceding falling edge 502b of the input clock signal SLCBO (waveform 500). In this case, because the length of time t6 does not meet set-up time requirements, the next cycle of output clock signal CK is suppressed, as represented by a waveform 508b.

Similarly, the first QUALH signal (waveform 504a) is deasserted (as represented by a falling edge 510a thereof) a time t7 after the immediately preceding falling edge 502b of the input clock signal SLCBO (waveform 500). Because the length of time t7 meets the set-up time requirements, the deassertion of the QUALH signal results in suppression of the next cycle of the output clock signal CK, as represented by a waveform 512a. In contrast, the second QUALH signal (waveform 504b) is deasserted (as represented by a falling edge 510b thereof) a time t8 after the immediately preceding falling edge 502b of the input clock signal SLCBO (waveform 500). Because the length of time t8 does not meet the set-up time requirements, the deassertion of the QUALH signal results fails to suppress the next cycle of the output clock signal CK, as represented by a waveform 512b.

Figure 6:
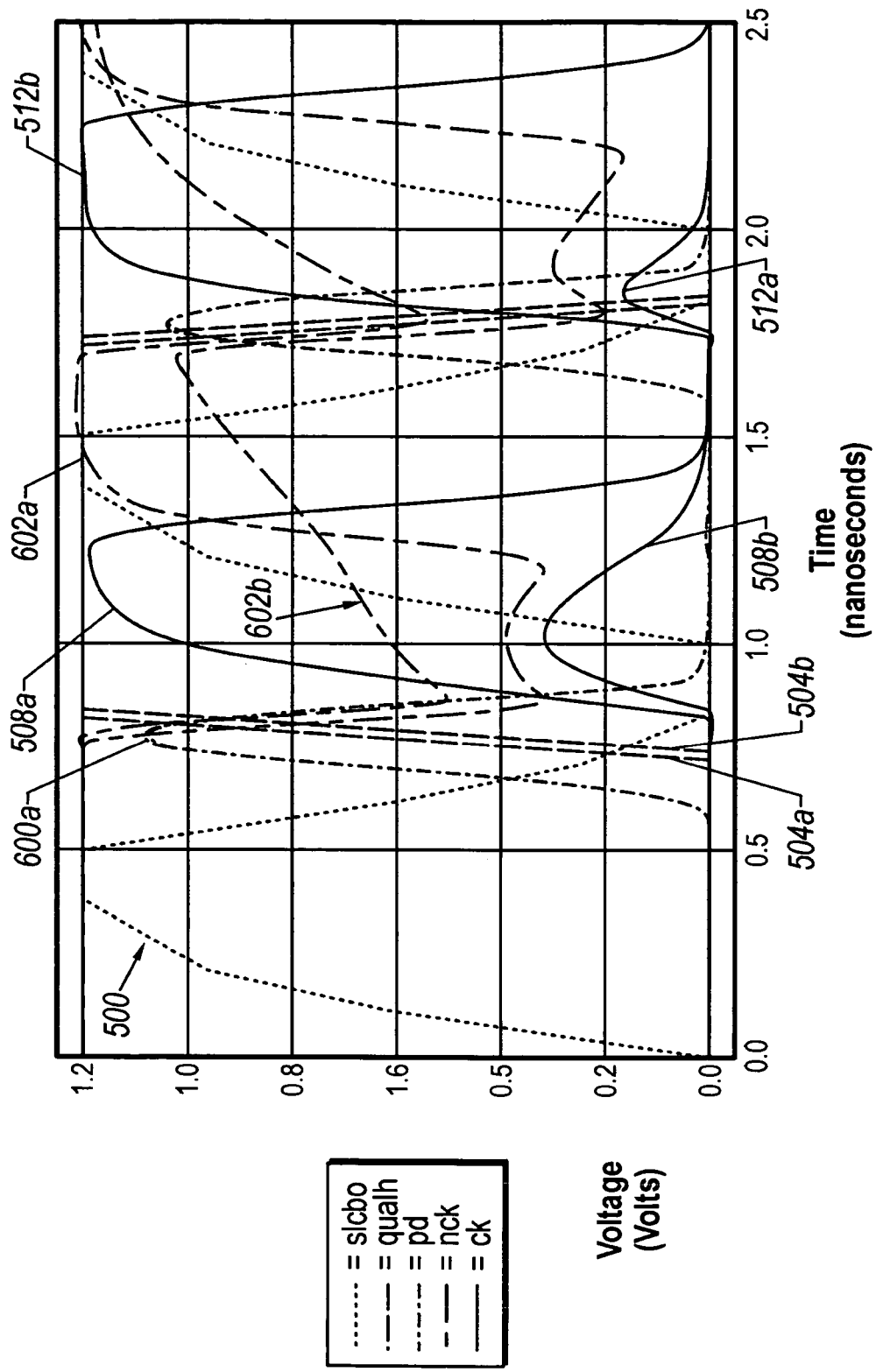

FIG. 6 illustrates a timing diagram that is identical to the timing diagram illustrated in FIG. 5 except that it includes several additional waveforms 600a, 602a and 602b. In this embodiment, a single waveform 600a is used to represent the voltage level of the control signal PD corresponding to both the earlier-asserted/deasserted QUALH signal (waveform 504a) and the later-asserted/deasserted QUALH signal (waveform 504b). This single waveform 600a is used because the voltage level of the PD signal over time responsive to both of the illustrated QUALH signals is nearly identical. The waveforms 602a and 602b represent the voltage level of a node nck respectively corresponding to the earlier-asserted/deasserted QUALH signal (waveform 504a) and the later-asserted/deasserted QUALH signal (waveform 504b).

Figure 2:
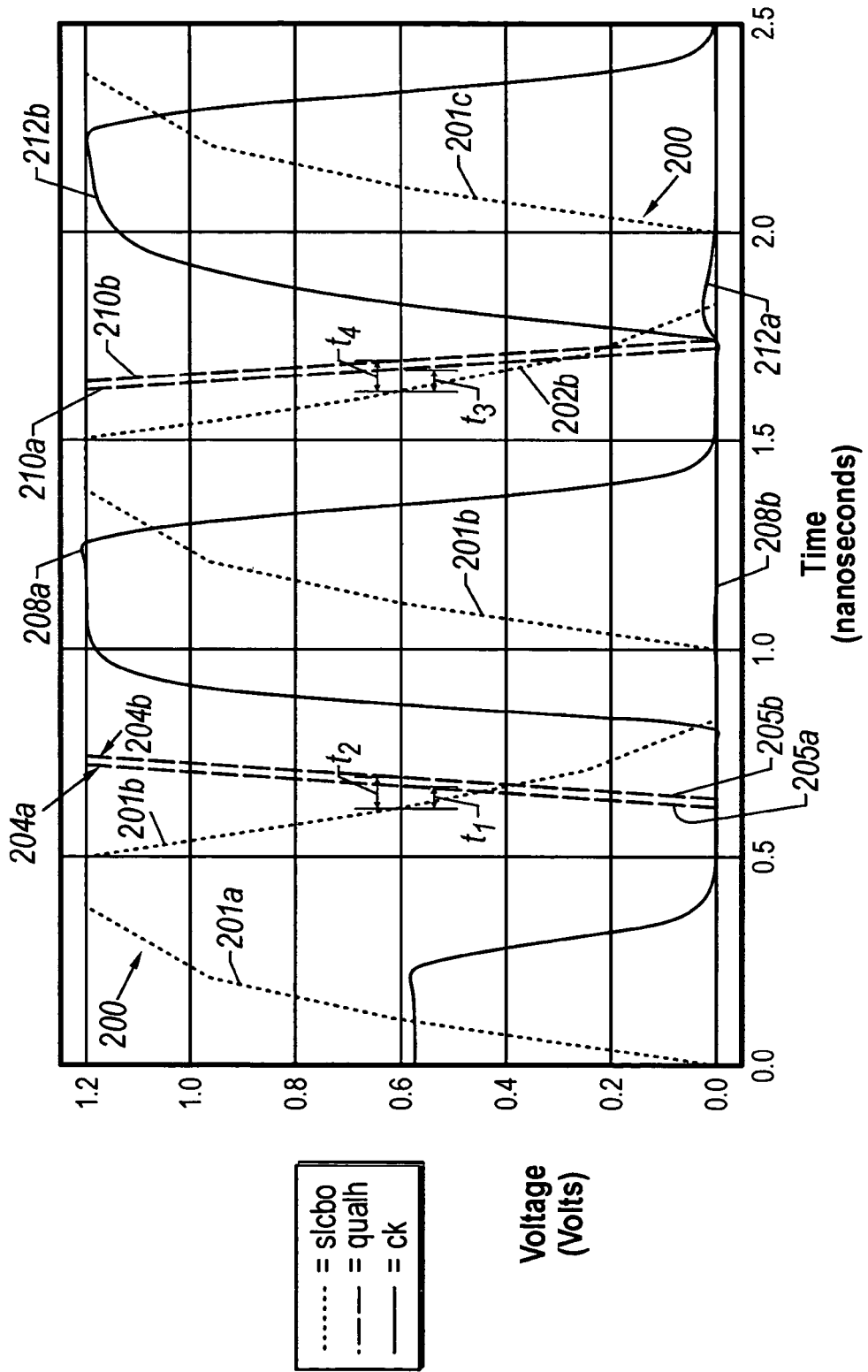
FIGS. 2 and 3 are timing diagrams illustrating operation of the prior art clock gater circuit of FIGS. 1A and 1B.
Figure 3:
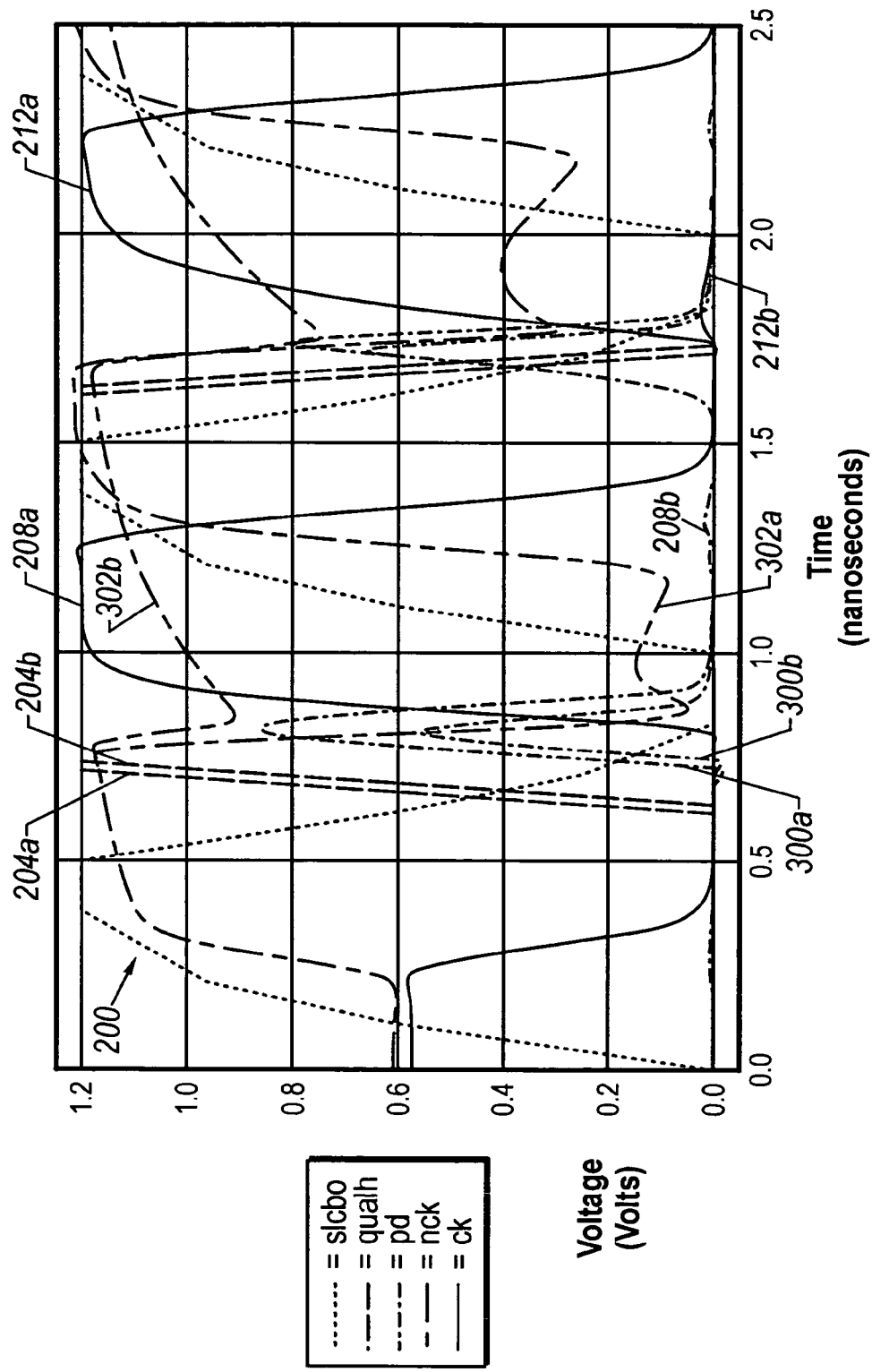

Comparing the timing diagram illustrated in FIG. 5 with the timing diagram illustrated in FIG. 2, it is significant that the QUALH signal represented by the waveform 504a is asserted and subsequently deasserted approximately 100 ps later than the QUALH signal represented by the waveform 204a and approximately 90 ps after the QUALH signal represented by the waveform 204b and yet, in accordance with the features of an embodiment described herein, still successfully enables and subsequently disables the respective next cycle of the output clock signal CK.

As best illustrated in the timing diagram of FIG. 6, as previously described, the control signal PD (waveform 600a) pulses whenever a falling edge on SLCBO occurs. However, the effect of the pull control signal PD on the nck node is "qualified" by assertion/deassertion of the QUALH signal (waveforms 504a, 504b). In particular, if the QUALH signal toggles very late with respect to the firing of the input clock signal SLCBO, the nck node 401 might begin to pull low, so the FETs 404, 406, pull up on the nck node 401 so that the output clock signal CK does not move.

Accordingly, as illustrated in FIG. 6, even after the pull control PD (waveform 600a) has fired with the QUALH signal asserted, the QUALH signal can still transition low and suppress the output clock in the same cycle. The QUALH signal can also transition high much after PD has fired and still trigger a clocking event. The result of this is a deeply negative, or decreased, set-up time.

It will be recognized that FET sizing is dependent on the requirements for a particular use. In general, for a typical phase gater, the width of the FET 402 can be the same or slightly smaller than the FET 104b. The widths of the FET 404 and the FET 406 should be similar and should be approximately ¼ the width of the FET 104b. The width of FET 104b depends on the load to be driven.

An implementation of the invention described herein thus provides a gater circuit that enables a reduced qualifier signal setup time with no area impact. It is believed that the operation and construction of the present invention will be apparent from the foregoing Detailed Description.

It should be noted that, although a phase gater has been described herein, other types of gaters, such as pulse gaters, phase gaters with modified duty cycles, and others, may be implemented in accordance with the teachings set forth herein.

Although the invention has been described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A clock gater circuit, comprising:
an inverter block for driving an output clock signal responsive at least in part to an input clock signal that is selectively driven via a clock generator circuit to an input node of said inverter block responsive to a qualifier signal, wherein said inverter block comprises a pair of cross-coupled inverters; and
circuitry for restoring a logic level at said input node of said inverter block to a particular value, said circuitry operating responsive to said qualifier signal.

2. The clock gater circuit as recited in claim 1, wherein said circuitry for restoring a logic level at said input node comprises a first transistor and a second transistor coupled together in series between a supply voltage node and said input node of said inverter block.

3. The clock gater circuit as recited in claim 2, wherein said first transistor comprises a P-channel MOSFET device whose gate is driven by said output clock signal.

4. The clock gater circuit as recited in claim 2, wherein said second transistor comprises a P-channel MOSFET device whose gate is driven by said qualifier signal.

5. The clock gater circuit as recited in claim 1, wherein said clock generator circuit comprises a pull-up MOSFET device and a pull-down MOSFET device disposed in series such that a switching MOSFET device is connected therebetween.

6. The clock gater circuit as recited in claim 5, wherein a gate terminal of said switching MOSFET device is driven by said qualifier signal.

7. The clock gater circuit as recited in claim 6, wherein said switching MOSFET device enables driving of said input clock signal to said input node of said inverter block responsive to a high voltage level of said qualifier signal.

8. The clock gater circuit as recited in claim 7, wherein said switching MOSFET device disables driving of said input clock signal to said input node of said inverter block responsive to a low voltage level of said qualifier signal.

9. A clock gater circuit, comprising:
clock generator means for selectively driving a clock signal to an input node of an inverter block, said clock generator means operating responsive to a qualifier signal, wherein said inverter block drives an output clock signal responsive to said clock signal at said input node, said inverter block including a pair of cross-coupled inverters; and
means for restoring a logic level at said input node of said inverter block to a particular value, said means operating responsive to said qualifier signal.

10. The clock gater circuit as recited in claim 9, wherein said means for restoring a logic level at said input node comprises a first transistor and a second transistor coupled together in series between a supply voltage node and said input node of said inverter block.

11. The clock gater circuit as recited in claim 10, wherein said first transistor comprises a P-channel MOSFET device whose gate is driven by said output clock signal.

12. The clock gater circuit as recited in claim 10, wherein said second transistor comprises a p-channel MOSFET device whose gate is driven by said qualifier signal.

13. The clock gater circuit as recited in claim 9, wherein said clock generator means comprises a pull-up MOSFET device and a pull-down MOSFET device disposed in series such that a switching MOSFET device connected therebetween is operable responsive to said qualifier signal.

14. A method of generating a clock signal using a clock gater circuit, comprising:
driving an input clock signal via a clock generator circuit portion of said clock gater circuit for generating an output clock signal, said driving being selectively controlled by a qualifier signal; and
maintaining a voltage level of said output clock signal at a current voltage thereof by a pull-up structure operating responsive to said qualifier signal, said pull-up structure including a first transistor and a second transistor coupled together in series such that said first transistor's gate is driven by said output clock signal and said second transistor's gate is driven by said qualifier signal.

15. The method of generating a clock signal as recited in claim 14, wherein said driving an input clock signal is effectuated by a switching MOSFET device whose gate is controlled by said qualifier signal.

16. The method of generating a clock signal as recited in claim 15, wherein said switching MOSFET device enables driving of said input clock signal responsive to a high voltage level of said qualifier signal.

17. The method of generating a clock signal as recited in claim 15, wherein said switching MOSFET device disables driving of said input clock signal responsive to a low voltage level of said qualifier signal.

* * * * *

UNITED STATES PATENT AND TRADEMARK OFFICE
CERTIFICATE OF CORRECTION

PATENT NO. : 7,116,150 B2  
APPLICATION NO. : 10/868515  
DATED : October 3, 2006  
INVENTOR(S) : Erin Dean Francom It is certified that error appears in the above-identified patent and that said Letters Patent is hereby corrected as shown below:

In column 7, line 45, in Claim 8, delete "claim 7" and insert -- claim 6 --, therefor.

Signed and Sealed this

Twenty-ninth Day of December, 2009

David J. Kappos  
*Director of the United States Patent and Trademark Office*